No. 757,635. PATENTED APR. 19, 1904.
J. W. PRIDMORE.
TREAD FOR TRACTION WHEELS.
APPLICATION FILED AUG. 16, 1902.
NO MODEL.
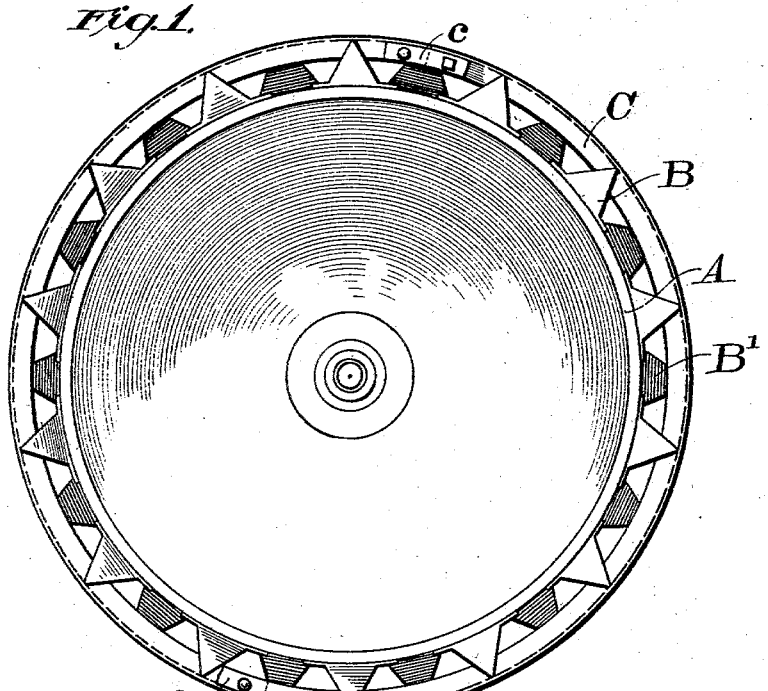
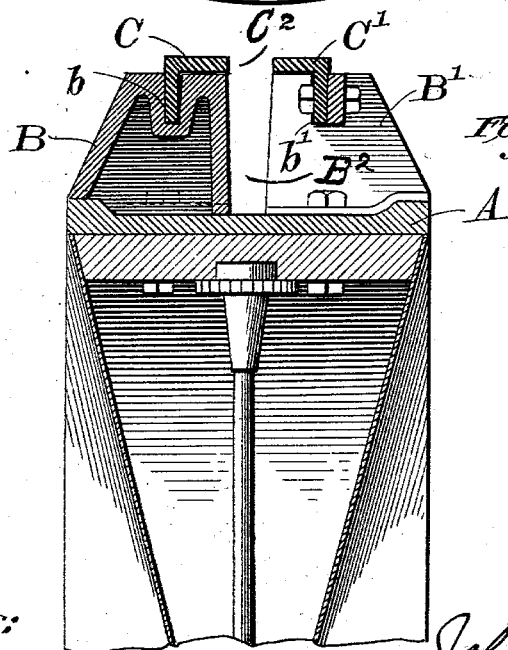

No. 757,635. Patented April 19, 1904.

UNITED STATES PATENT OFFICE.

JOHN W. PRIDMORE, OF CHICAGO, ILLINOIS, ASSIGNOR TO INTERNATIONAL HARVESTER COMPANY, OF CHICAGO, ILLINOIS, A CORPORATION OF NEW JERSEY.

TREAD FOR TRACTION-WHEELS.

SPECIFICATION forming part of Letters Patent No. 757,635, dated April 19, 1904.

Application filed August 16, 1902. Serial No. 119,839. (No model.)

*To all whom it may concern:*

Be it known that I, JOHN W. PRIDMORE, a citizen of the United States, residing at Chicago, in the county of Cook and State of Illinois, have invented certain new and useful Improvements in Treads for Traction-Wheels, of which the following is a specification.

My invention relates to improvements in traction-wheels, and more especially to such traction-wheels as are used in machines adapted to be operated in very soft or muddy ground—for example, a rice-harvester. Wheels of this kind are of a necessity provided with very large lags in order that they may sufficiently engage the soil to furnish the required traction.

The object of my invention is to provide a continuous detachable tread at the periphery of the lags, so that the jarring and shaking of the machine, which is so detrimental to its efficiency and durability, may be obviated when it is being used where the ground is hard or being transported over a hard road.

My tread is adapted to be applied to the type of wheel shown in my Patent No. 648,881, issued May 1, 1900. It is to be noted that when the tread is in position on the wheel it does not prevent the use of or interfere with the clearer shown in the patent above referred to. I attain these objects in a manner illustrated in the accompanying drawings, in which—

Figure 1 is a side elevation of a rice-harvester traction-wheel, showing the tread in position. Fig. 2 is a fragmentary view of a transverse section through the center of said wheel, showing the manner of applying tread.

Secured to the rim A in the usual manner, preferably in two rows, are the lags B and B'. These lags are a little narrower than half the width of the rim, thus leaving an annular space $B^2$ between the rows, which accommodates the clearer above referred to. The lags of each row are provided with transverse grooves in their apexes, which taken together form the interrupted annular grooves $b$ and $b'$, into which are fitted the treads C and C', respectively. Each of these treads is preferably formed of two or more segmental sections, so that they may readily be applied or detached, and have the annular space $C^2$ between them, which space corresponds to the annular space $B^2$ between the rows of lags. One end of each section is provided with an offset portion adapted to overlap the abutting end of the adjacent section, to which it is secured in any desirable manner, preferably by means of a bolt. As herein shown, this offset portion consists simply of a plate $c$, which is riveted to one end of each tread-section.

The tread may be made of material of any desired cross-section, but preferably of angle-iron, one leg being inserted in the annular groove and the other lying on top of the lags and extending toward the center of the rim, its inner extremity being substantially flush with the inner edge of the lags, as herein shown.

Having thus described my invention, what I claim as new, and desire to secure by Letters Patent, is—

1. In a traction-wheel comprising a plurality of rows of lags having an annular space between them, and treads overlying the lags and having an annular space between them corresponding to the space between the rows of lags.

2. In combination, in a traction-wheel, the rows of lags B, B', the annular space $B^2$ between said rows, and the separate treads C, C', overlying the rows of lags B, B', respectively, and having the annular space $C^2$ between the treads corresponding to the space between the rows of lags.

3. In combination in a traction-wheel, the lags B and B' secured to the rim thereof, the annular space $B^2$ between said lags, the grooves $b$ and $b'$ in the apexes of said lags, the treads C and C' having one member lying over the lags and a transverse member lying in said grooves respectively and the plate $c$ by means of which the sections of said treads are secured together and in position.

In testimony whereof I have signed my name to this specification in the presence of two subscribing witnesses.

JOHN W. PRIDMORE.

Witnesses:
CHAS. N. CHAMBERS,
J. MUHLEMAN.